United States Patent [19]
Paskell

[11] Patent Number: 5,804,792
[45] Date of Patent: Sep. 8, 1998

[54] GAS TUNGSTEN ARC WELDING FLUX

[75] Inventor: Troy D. Paskell, Hilliard, Ohio

[73] Assignee: Edison Welding Institute, Inc., Columbus, Ohio

[21] Appl. No.: 629,733

[22] Filed: Apr. 9, 1996

[51] Int. Cl.$^6$ .................................................. B23K 9/167
[52] U.S. Cl. .................................... 219/137 WM; 148/26
[58] Field of Search .................................. 219/137 WM, 219/136, 137 R, 74, 75; 148/23, 26

[56] References Cited

U.S. PATENT DOCUMENTS

| | | | |
|---|---|---|---|
| 2,473,600 | 6/1949 | Lobosco | 219/74 |
| 2,473,601 | 6/1949 | Lobosco | 219/74 |
| 5,525,163 | 6/1996 | Conaway et al. | 148/23 |

OTHER PUBLICATIONS

O.E. Ostrovskii et al—"The Effect of Activating Fluxes on the Penetration Capability of the Welding Arc and the Energy Concentration in the Anode Spot"; Svar. Proiz., 1977, No. 3 pp. 3–4.

B. Pollard—"The Effects of Minor Elements on the Welding Characteristics of Stainless Steel"; Welding Research Supplement, Sep. 1988, pp. 202–213.

C.R.Heipler and J.R.Roper—"Mechanism for Minor Element Effect on GTA Fusion Zone Geometry"; Welding Research Supplement, Apr. 1982, pp. 97–102.

G.J.Theus and R.W. Staehle—"Review of Stress Corrosion Cracking and Hydrogen Embrittlement in the Austentic Fe–Cr–Ni Alloys"; Conference Proceedings, Jun. 12–16, 1973, pp. 845–891.

*Primary Examiner*—Clifford C. Shaw
*Attorney, Agent, or Firm*—E. Paul Forgrave

[57] ABSTRACT

An easy to apply flux for increasing the penetration of gas tungsten arc welding of stainless steel substantially independent of flux thickness and variations in composition from heat to heat of stainless steel includes a flux consisting of reagent or laboratory grade TiO or $TiO_2$ (about 50%), $Cr_2O_3$ (about 40%), and $SiO_2$ (about 10%) in a liquid carrier, preferably of methyl ethyl ketone. The flux is easy to apply, increases penetration of the weld, decreases bead width, and increases weld cross sectional area.

11 Claims, 12 Drawing Sheets

Without Flux

TiO $Cr_2O_3$ $SiO_2$

TiO/Cr$_2$O$_3$/SiO$_2$

Heat No. 848184

Heat No. 143139

Heat No. 110067

Heat No. 853055

Heat No. 915008

Heat No. 856893

Heat No. 220832

Heat No. 40797

Ukranian Flux No. FS-71

EWI Flux No. SS7

Ukranian Flux No. FS-71

EWI Flux No. SS7

Heat No. 848184

Heat No. 220832

GAS TUNGSTEN ARC WELDING FLUX

BACKGROUND OF THE INVENTION

Gas tungsten arc welding of stainless steels has been hindered by the limitation in the depth of penetration that can be achieved in a single weld pass. In the past, in order to weld thicknesses in excess of typically less than 1/16 in., the edges of the base metal must be prepared and successive layers of weld metal must be made to fill up preparation.

An added problem for welding stainless steel is the variations in the depth of penetration that results from slight differences in the base metal chemistries from heat to heat (that is, different batches of the same type of material). This is more fully described in two articles: "Mechanism for Minor Element Effect of GTA Fusion Zone Geometry," C. R. Heiple and J. R. Roper, Welding Research Supplement, pp. 97s–102s, April, 1982; and "The Effects of Minor Elements on the Welding Characteristics of Stainless Steel," by B. Pollard, Welding Research Supplement, pp. 202s–213s, September, 1988. These slight changes in base metal chemistry cannot be practically controlled. Although the relationship between penetration and base metal chemistry is not completely understood, it is typically believed that sulfur is a major contributor to the variability in penetration. As the sulfur content increases, the depth of penetration increases until a maximum is achieved. However, further increase in sulfur can promote solidification cracking and reduce the formability of the stainless steel material thus welded.

A method of increasing both the amount and consistency of penetration would provide a significant economic benefit to industry. One such method described here, uses a thin layer of inorganic powders (i.e., flux) which are applied in the form of thin paste to the surface of the base metal prior to welding. The liquid carrier evaporates leaving only the powders on the surface. As the welding arc passes over the powder, the depth of penetration can be increased up to three times for a given heat input. In addition, the same amount of penetration is achieved regardless of the base metal chemistries.

The use of flux for increasing the penetration in stainless steel was previously reported by O. E. Ostroviski in an article entitled "The Effect of Activating Fluxes on the Penetration Capability of the Welding Arc and the Energy Concentration in the Anode Spot," Svar. Proiz, No. 3, pp. 3–4, 1977. The formulation for this prior art flux is listed in Table 1.

TABLE 1

Stainless Steel Flux No. FS-71 reported by Ostrovskii

| % | Compound |
|---|---|
| 57.3 | $SiO_2$ |
| 6.4 | NaF |
| 13.6 | $TiO_2$ |
| 13.6 | Ti |
| 9.1 | $Cr_2O_3$ |

The Ostrovskii FS-71 flux did not apply very well, requiring careful attention in its application to produce a consistent layer of flux. More importantly, the flux did not have good adhesion and would blow away during welding causing inconsistent penetration. The inclusion of NaF in the formulation may decrease the corrosion potential of the weldment if the slag is not thoroughly removed. See "Review of Stress Corrosion Cracking and Hydrogen Embrittlement in the Austenitic Fe—Cr—Ni Alloys," by G. J. Theus and R. W. Staehle, Proceedings on Stress Corrosion Cracking and Hydrogen Embrittlement of Iron Base Alloys, Uniesus-Firminy, France, Jun. 12–16, 1973. There is no indication in the Ostrovskii article that flux described eliminated heat-to-heat variations in penetration.

SUMMARY OF THE INVENTION

In the present invention, a flux has been developed which is easy to apply and which remains on the base stainless steel material, and further, which provides for increased penetration substantially independent of heat-to-heat variations in the stainless steel.

In the present invention, the flux includes TiO or $TiO_2$, $Cr_2O_3$ and $SiO_2$, but no NaF. It was found that fluxes made from this combination provided the desired welding and application characteristics.

Accordingly, it is an object of this invention to provide an improved flux for use in welding stainless steel to increase penetration, said flux consisting essentially of, in combination essentially pure oxide of titanium, $Cr_2O_3$, and $SiO_2$ in a liquid carrier. In the preferred embodiments of the invention, the oxide of titanium is either TiO or $TiO_2$ and the liquid carrier is methyl ethyl ketone. Further, the oxide of titanium is in the range of from 30% to 70%, $Cr_2O_3$ is in the range of 20% to 60%, and $SiO_2$, is in the range of 5% to 15%. In a practical flux, the flux consists of about 50% TiO or $TiO_2$, about 40% $Cr_2O_3$, and about 10% $SiO_2$.

It is further object of this invention to provide a method of joining stainless steel components comprising the steps of applying a thin layer of liquid flux over the joint, said liquid flux containing an oxide of titanium, $Cr_2O_3$, and $SiO_2$ in a liquid carrier, and welding the components together using a gas tungsten arc welding torch whereby said liquid flux eliminates the variation in cross-sectional shape that results from heat-to-heat changes in the base metal chemistries of the stainless steel components being welded. In a preferred embodiment, the method further includes the steps of using the following approximate welding parameters for welding a ¼ inch thick 304 stainless steel component: about 150 A welding current, about 9 V welding voltage, about 3 inches per minute welding torch travel speed, and a shielding gas of argon flowing at approximately 25 to 30 cubic feet per hour and a backing gas of argon flowing at approximately 20 cubic feet per hour.

Other objects and advantages of the invention will be apparent from the following description, the accompanying drawings and the appended claims.

BRIEF DESCRIPTION OF THE DRAWINGS

FIG. 1A shows a weld made without flux; Fig. 1B show a weld made with a flux of TiO only; Fig. 1C shows a weld made with a flux of $Cr_2O_3$ only; Fig. 1D shows a weld made with a flux containing $SiO_2$ only; and Fig. 1E shows a weld made with a flux containing a combination of TiO, $Cr_2O_3$ and $SiO_2$;

FIG. 3A shows a weld made with a prior art flux and FIG. 3B show a weld made with Flux No. SS7;

FIG. 4A shows a weld made with a prior art flux and FIG. 4B show a weld made with Flux No. SS7;

DESCRIPTION OF THE PREFERRED EMBODIMENT

Reference is now made to FIGS. 1–4 which show welds in a ¼ in thick Type 304 stainless steel plate with and without flux using the welding procedures listed in Table 2. The dimensions for cross sections of welds made with and without different fluxes are listed in Table 3. Fig. 1A shows the weld without flux has shallow penetration and is fairly wide. FIGS. 1B–D, show that the addition of each individual compound produced an increase in penetration and area, and a reduction in bead width. In Fig. 1B, TiO alone has been used; in FIG. 1C, $Cr_2O_3$ alone has been used; and in Fig. 1D, $SiO_2$ alone has been used. As shown, none of the individual components caused complete penetration of the stainless steel sheet. On the other hand, as illustrated in Table 3, the penetration using the individual components was increased at least 100%, while the bead width was reduced by 40%.

Figure 1A:
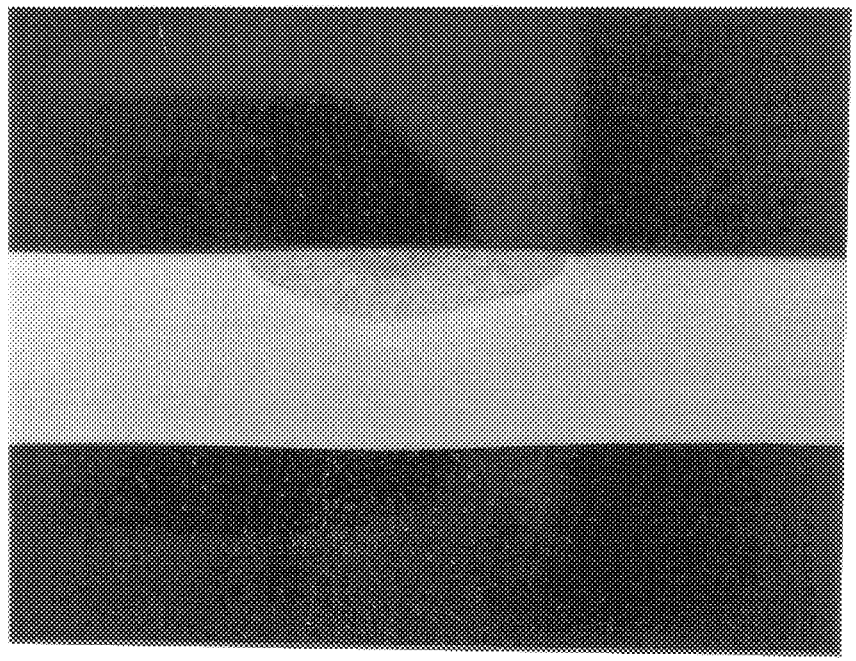
FIGS. 1A to 1E are photographs of cross sections of partial penetration welds made in a ¼ inch thick plate of Type 304 stainless steel at a current of 125 amps.
Figure 1B:
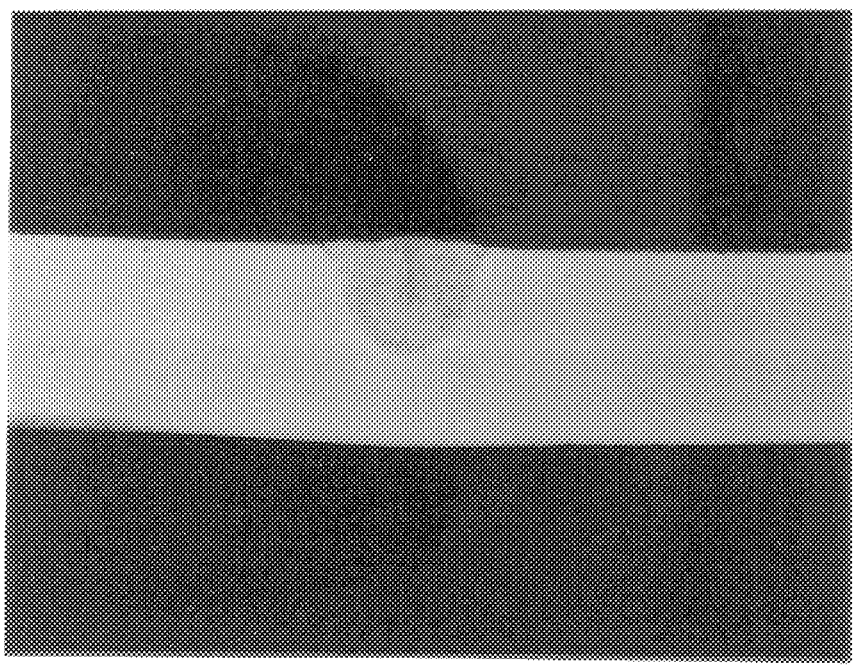
Figure 1C:
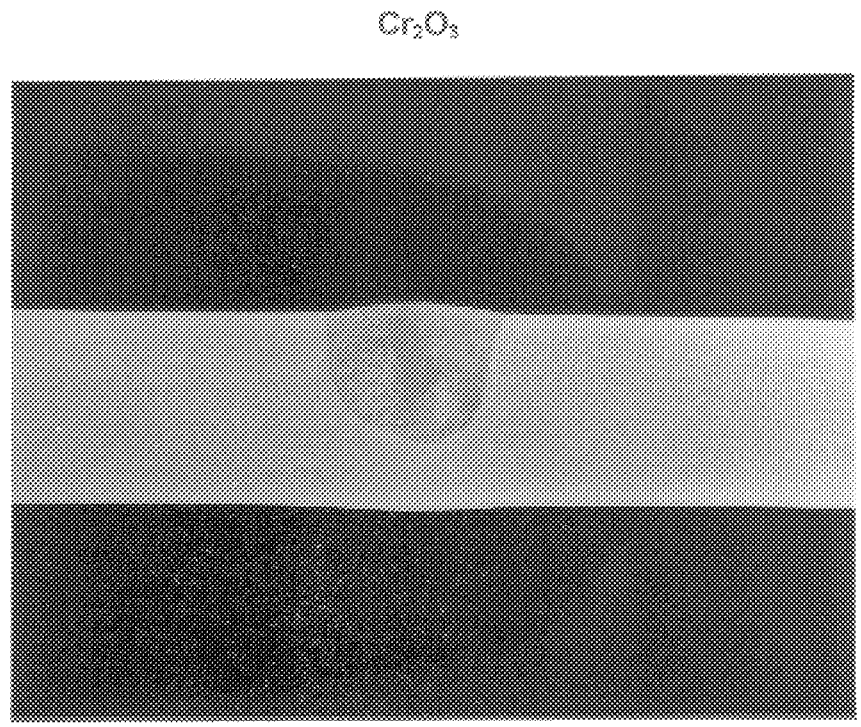
Figure 1D:
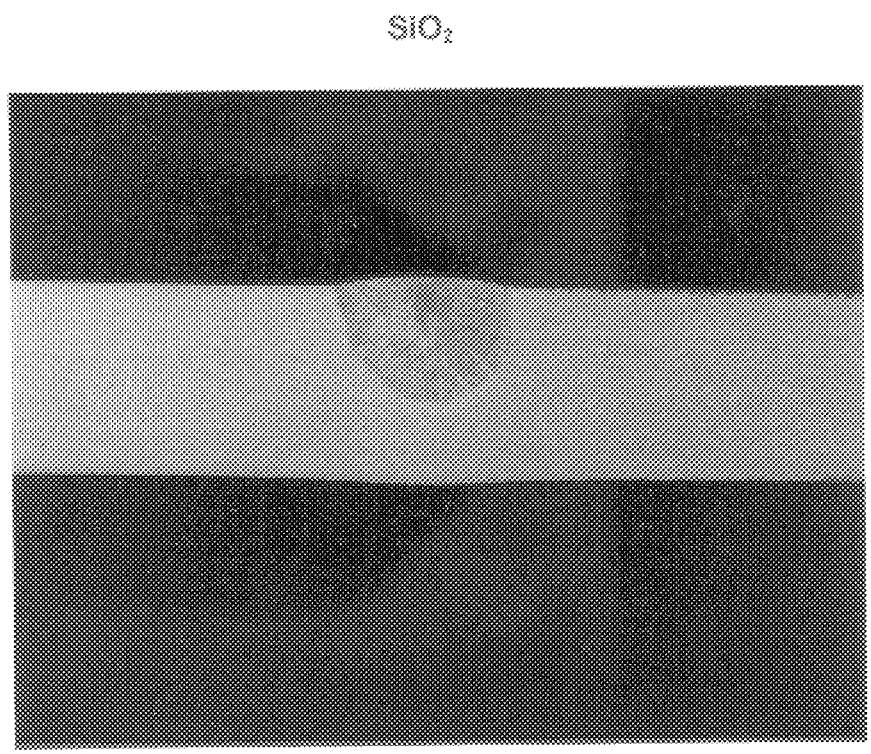
Figure 1E:
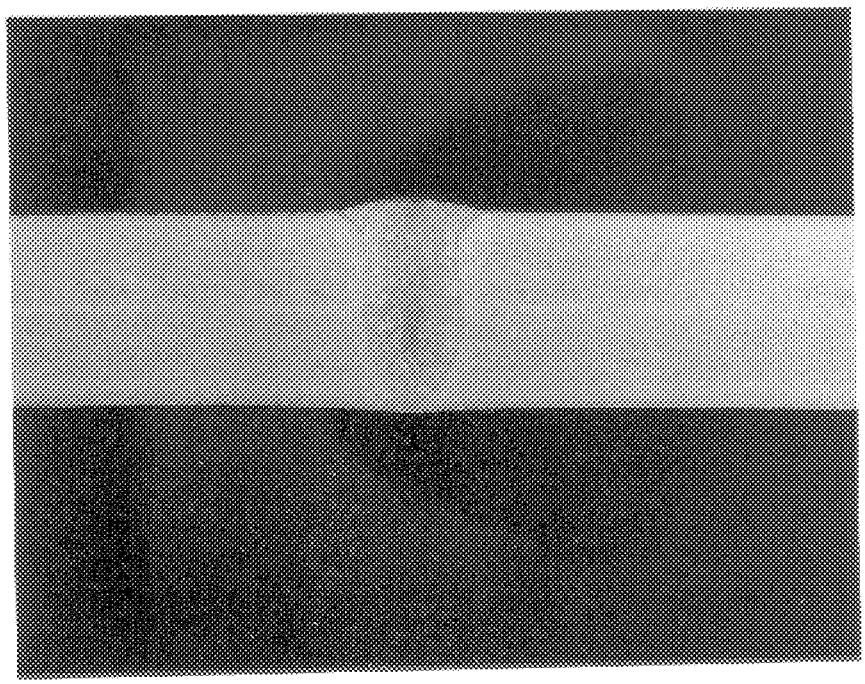
Figure 2A:
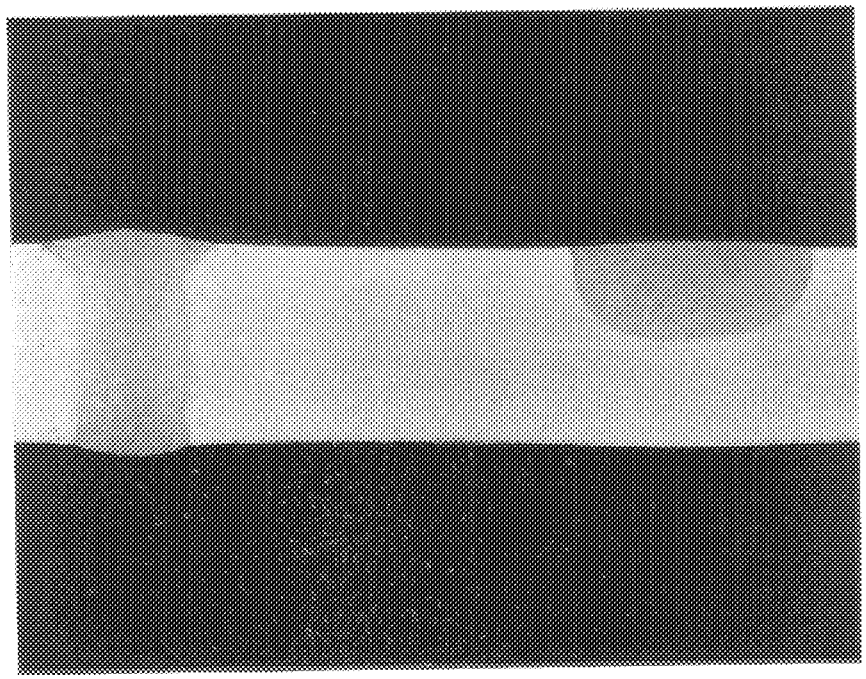
FIGS. 2A to 2H are photographs of cross sections of welds made with and without flux No. SS7 on different heats of stainless steel; the welds on the right side of each photograph were made without flux.
Figure 2B:
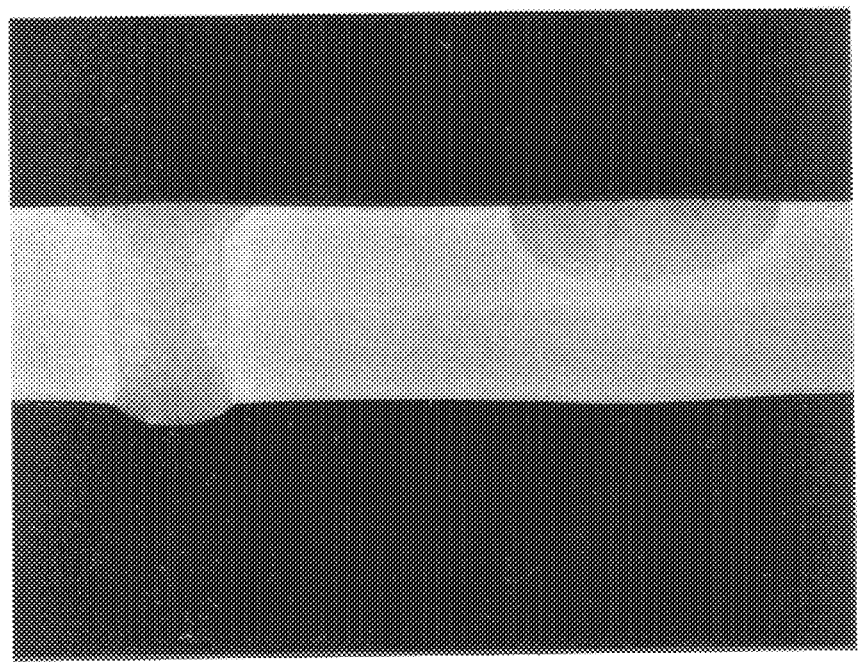
Figure 2C:
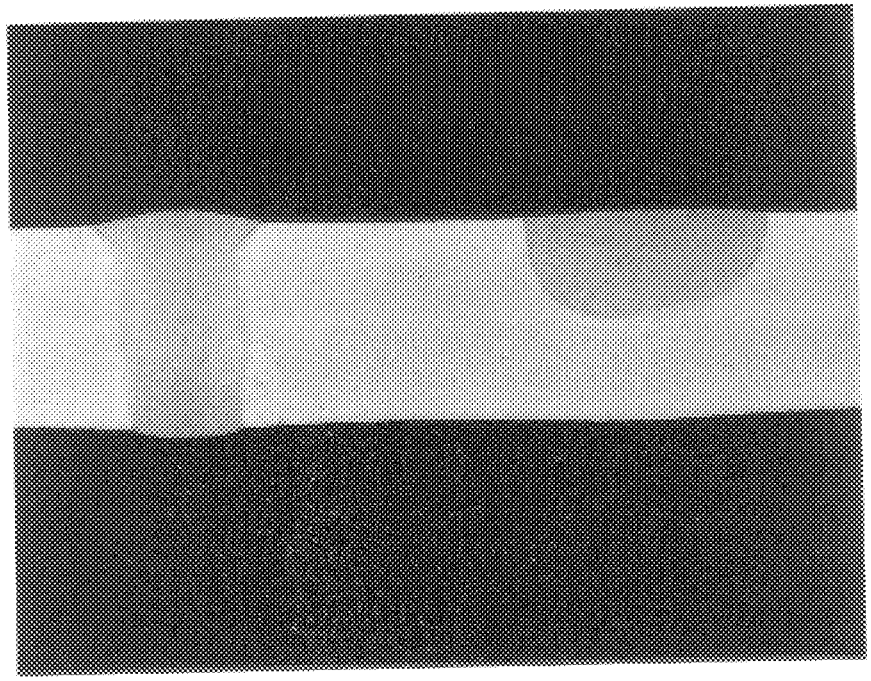
Figure 2D:
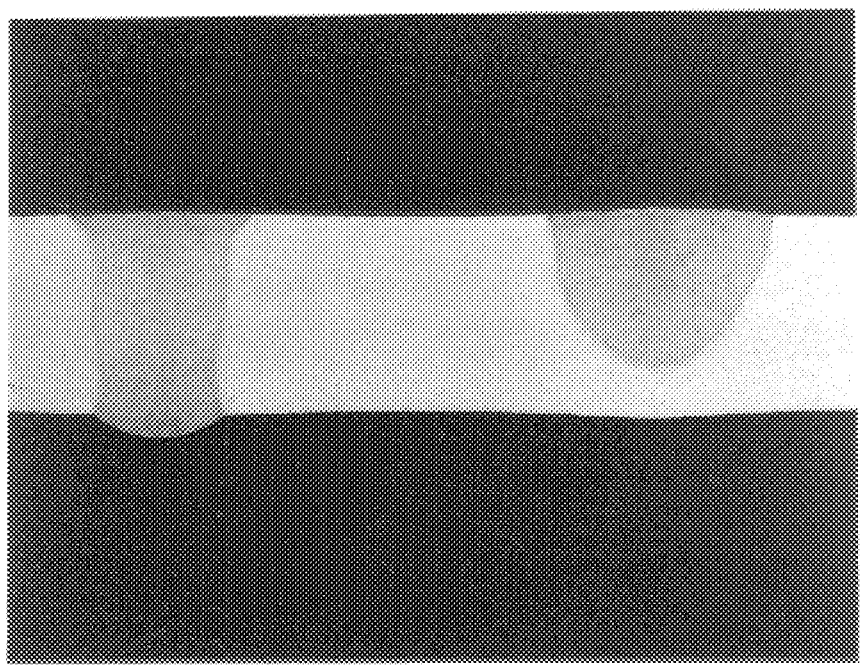
Figure 2E:
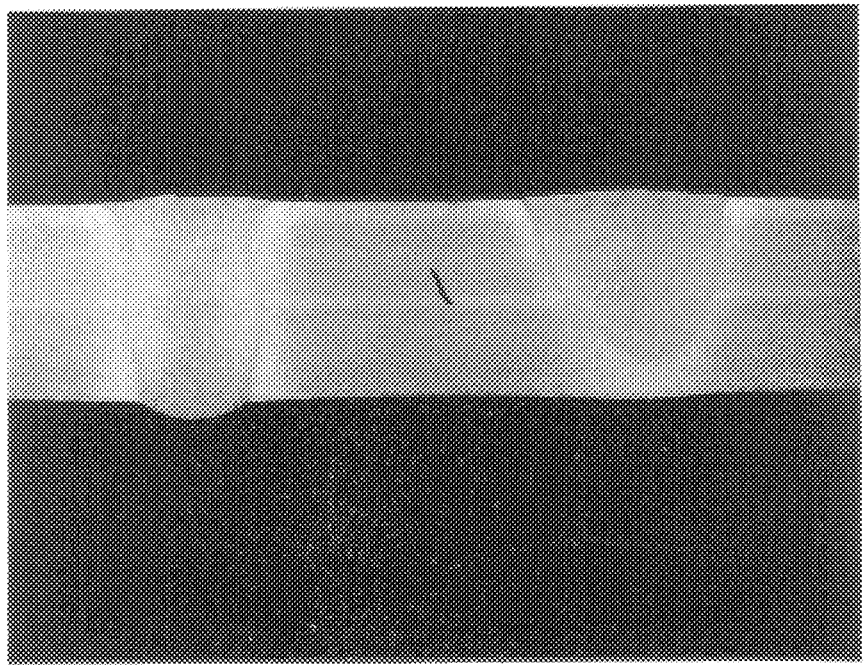
Figure 2F:
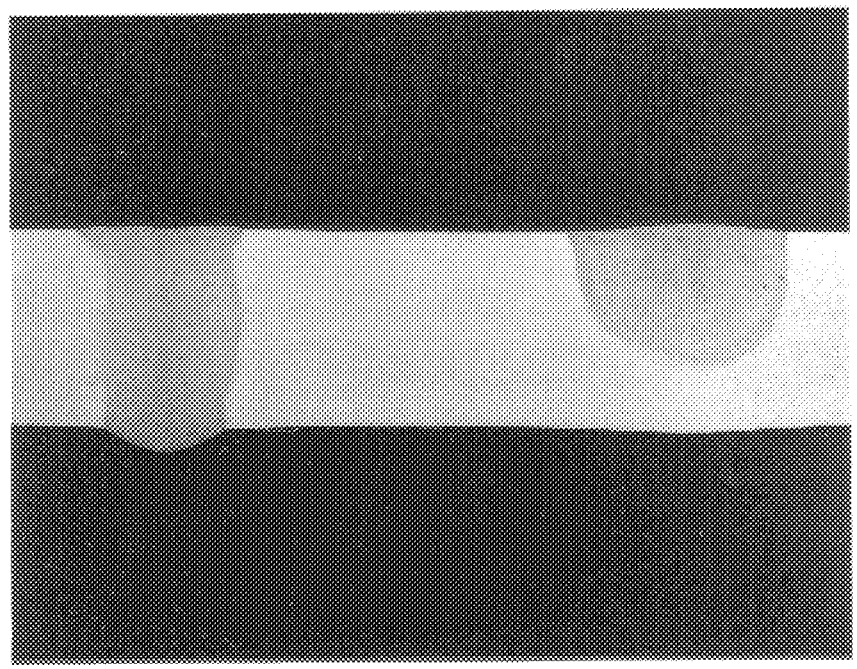
Figure 2G:
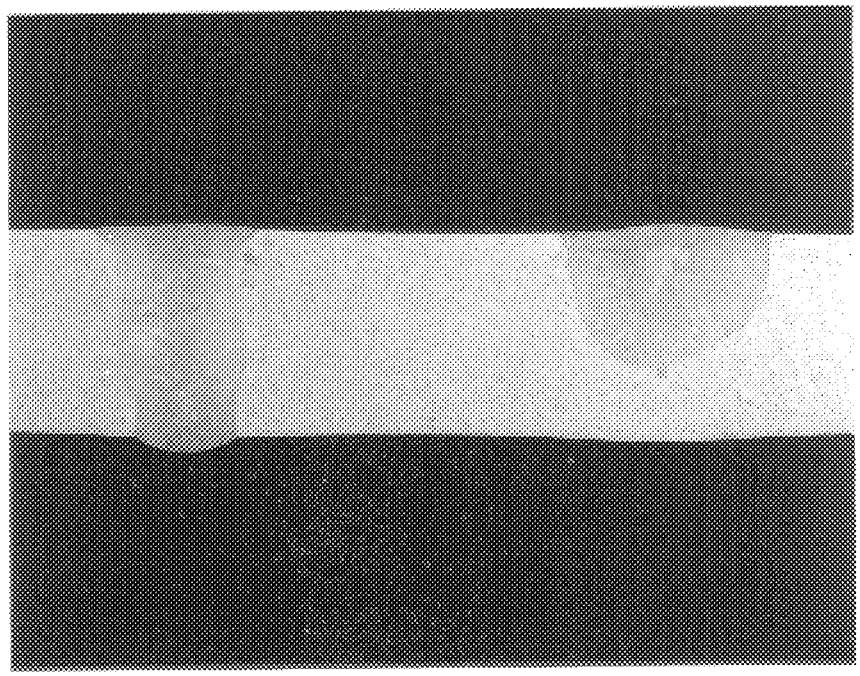
Figure 2H:
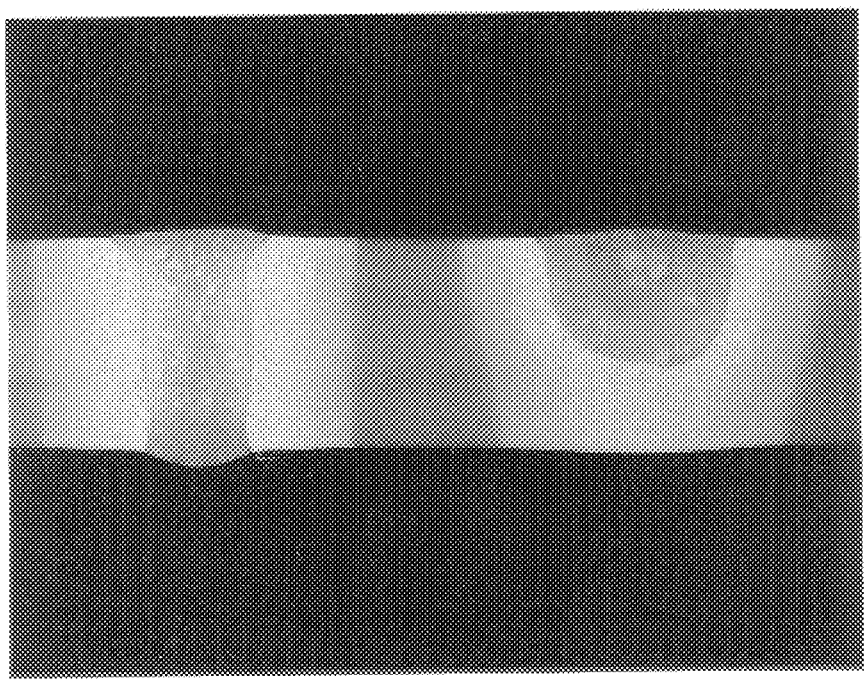

By combining the individual components of 50 parts TiO, 40 parts $Cr_2O_3$, 10 parts $SiO_2$, the change in cross sectional shape was even more dramatic, as shown in FIG. 1E and in Table 2. The penetration produced using this mixture was increased by 220% and the bead width was reduced by 40% as compared to the weld without flux. This resulted in an increase of the penetration-to-width ratio of greater than 440%. In addition, the addition of the fluxes increased the cross section area of the weld. For example, the flux mixture allowed an increase in the area of 28% over that of the weld made without flux. This indicates that the process efficiency is improved with the use of the flux of the p resent invention.

TABLE 2

Welding Procedures Used to Produce Partial Penetration Welds in ¼ in. Thick Type 304 Stainless Steel

| Current | 125 A |
|---|---|
| Voltage | 9 V |
| Travel speed | 3 ipm |
| Shielding gas | argon |

TABLE 3

Penetration, Bead Width, and Penetration-to-Width Ratio for Welds Made With and Without Different Fluxes Using the Welding Procedures Listed in Table 2.

| Flux | Penetration (in.) | Bead Width (in.) | Penetration/ Width | Area (in.²) |
|---|---|---|---|---|
| None | 0.074 | 0.330 | 0.22 | 0.0198 |
| TiO | 0.166 | 0.196 | 0.85 | 0.0237 |
| $Cr_2O_3$ | 0.179 | 0.215 | 0.83 | 0.0291 |
| $SiO_2$ | 0.149 | 0.226 | 0.66 | 0.0288 |
| 50TiO/40$Cr_2O_3$/ 10$SiO_2$ | 0.240 | 0.200 | 1.2 | 0.0254 |

To evaluate the difference between TiO and $TiO_2$, a series of welds were made using the procedures listed in Table 4. Welds were made using the flux mixture listed in Table 3 and with a mixture that used $TiO_2$ instead of TiO. Although, both flux mixtures produced complete penetration, the mixture with TiO yielded a more consistent penetration. In addition, the TiO mixture was not as sensitive to thickness of the flux layer.

TABLE 4

Welding Procedures Used to Produce Complete Penetration Welds in ¼ in Thick Type 304 Stainless Steel

| Current | 150 A |
|---|---|
| Voltage | 9 V |
| Travel speed | 3 ipm |
| Shielding gas | argon |

Comparison of TiO to TiOx/Ti. In order to compare the performance of TiO to a combination of $TiO_2$ and Ti in a flux, a group of seven fluxes was created, as shown in Table 5, and then a series of welds were made to evaluate these fluxes. Welds were made using two different heats of ¼ in. thick Type 304 stainless steel using the procedures listed in Table 4. The results indicated that Flux No. SS24 produced similar results of Flux No. SS7. However, SS7 appeared to produce more consistent penetration.

TABLE 5

Fluxes that Were Used to Evaluate Different Ratios of $TiO_2$/Ti to TiO.

| Flux No. | TiO | $TiO_2$ | Ti | $Cr_2O_3$ | $SiO_2$ |
|---|---|---|---|---|---|
| SS7 | 50 | | | 40 | 10 |
| SS19 | | 50 | | 40 | 10 |
| SS20 | | | 50 | 40 | 10 |
| SS21 | | 35 | 15 | 40 | 10 |
| SS22 | | 15 | 35 | 40 | 10 |
| SS23 | | 40 | 10 | 40 | 10 |
| SS24 | | 10 | 40 | 40 | 10 |

Another series of welds were produced in eight different heats of Type 304 stainless steel using the welding procedures listed in Table 4 to compare Flux Nos. SS7 and SS24.

In certain heats of stainless steel materials, both fluxes performed equally as well, producing complete penetration. However, overall, Flux No. SS7 (using TiO) yielded the most consistent result over the entire eight heats of material. FIGS. 2A–2F shows welds in the eight heats that were made without and with Flux No. SS7. Each photograph shows two welds, the one on the left is made with Flux No. SS7, the one on the right was made without any flux.

| FIG. | Heat |
|---|---|
| 2A | 848184 |
| 2B | 143139 |
| 2C | 110067 |
| 2D | 853055 |
| 2E | 915088 |
| 2F | 856893 |
| 2G | 220832 |
| 2H | 407797 |

Component Percentage Ranges. A statistical design of experiments was employed to determine the range of each component in Flux No. SS7 that would produce a substantial increase in penetration. Welds were made in two different heats of ¼ in. thick Type 304 stainless steel that had different degrees of penetration without flux. Welds were made using the welding procedure listed in Tables 2 and 4. Welds made with the welding procedures listed in Table 2 were used in the statistical analysis, while the welds produced with the procedure in Table 4 was used for empirical analysis. Acceptance criteria for the statistical analysis was that the flux had to apply easily and adhere well to the surface of the plate, and the penetration had to be greater than 0.19 in.

Table 6 lists the penetration that was produced in both heats of material without and with Flux No. SS7 using the procedures listed in Table 2.

TABLE 6

Partial Penetration of Welds in Two Different Heats of ¼ in. Thick Type 304 Stainless Steel Plate During the Statistical Design of Experiments Using the Welding Procedures Listed in Table 2.

| Heat No. | Flux | Penetration (in.) |
|---|---|---|
| 143139 | None | 0.074 |
| 220832 | None | 0.154 |
| 143139 | SS7 | 0.24 |
| 220832 | SS7 | 0.182 |

Table 7 lists the penetration of the welds produced using the welding procedures listed in Table 4.

TABLE 7

Penetration of Welds in Two Different Heats of ¼ in. Thick Type 304 Stainless Steel Plate During the Statistical Design of Experiments Using the Welding Procedures Listed in Table 2.

| Heat No. | Flux | Penetration (in.) |
|---|---|---|
| 143139 | None | 0.095 |
| 220832 | None | 0.179 |

TABLE 7-continued

Penetration of Welds in Two Different Heats of ¼ in. Thick Type 304 Stainless Steel Plate During the Statistical Design of Experiments Using the Welding Procedures Listed in Table 2.

| Heat No. | Flux | Penetration (in.) |
|---|---|---|
| 143139 | SS7 | 0.240 (a) complete penetration |
| 220832 | SS7 | 0.250 (a) complete penetration |

(a) Welds made with flux produced complete penetration. The difference in penetration values is due to slight differences in plate thicknesses.

As shown in Tables 6 and 7, the two heats of stainless steels had inherent differences in penetration without flux. As the flux was applied, the penetration was increased for the partial penetration welds listed in Table 6. However, the flux did not produce the exact same amount of penetration with Flux No. SS7. As shown in Table 7, when producing complete penetration welds, Flux No. SS7 allowed complete penetration to be obtained regardless of the heat of material.

The statistical analysis of the penetration, the application and adherence of the flux indicated that the percentage ranges for the components will be as listed in Table 8.

TABLE 8

The Range of Percentages for the Components in Stainless Steel Flux as Determined by a Statistical Design of Experiment

| Component | Low | High |
|---|---|---|
| TiO | 41 | 63 |
| $Cr_2O_3$ | 28 | 76 |
| $SiO_2$ | 6 | 27 |

Figure 3A:
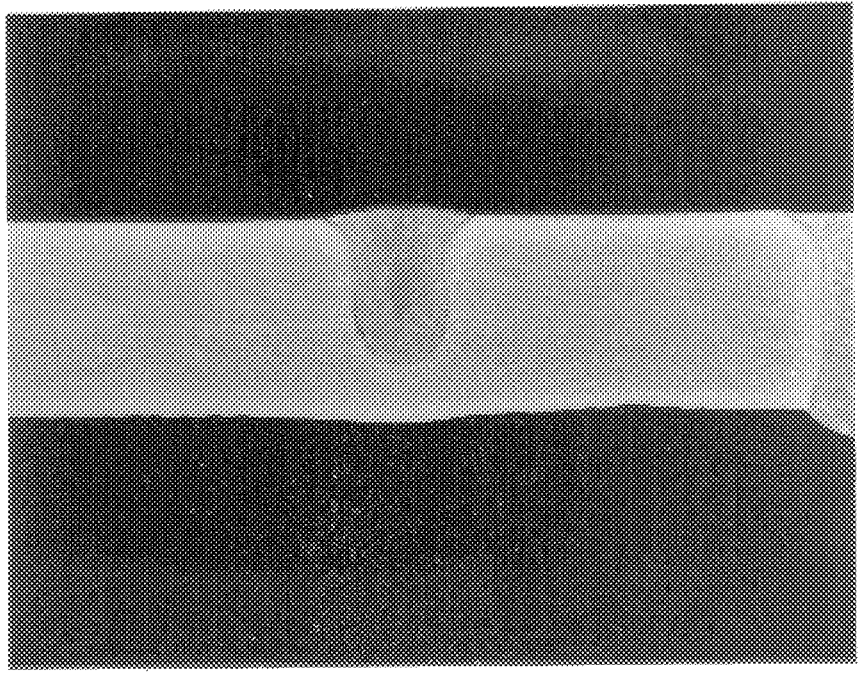
FIGS. 3A and 3B are photographs of cross sections of welds made on a ¼ inch thick plate of Type 304 stainless steel, both at a weld current of 125 amps, a voltage of 9 volts and a travel speed of 3 ipm.
Figure 3B:
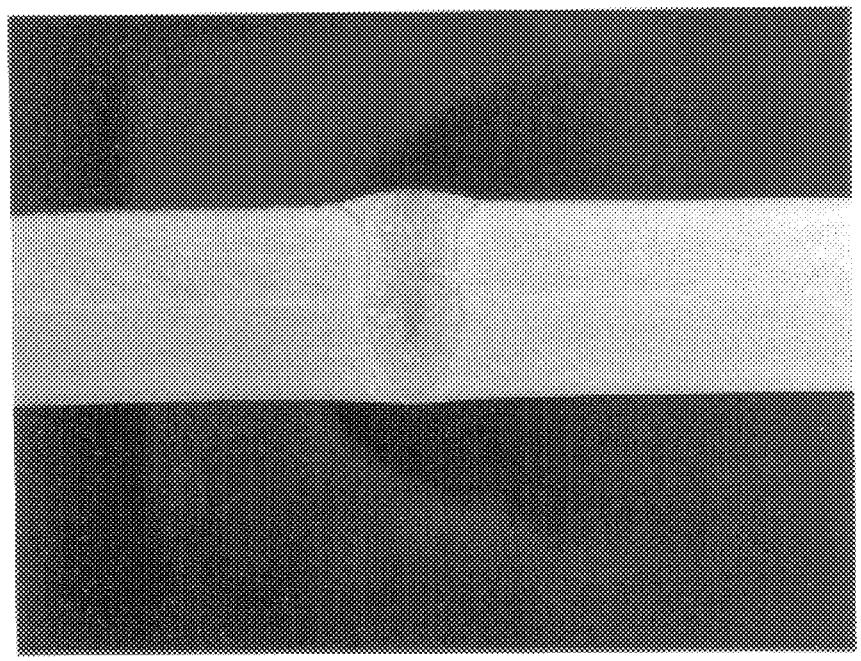
Figure 4A:
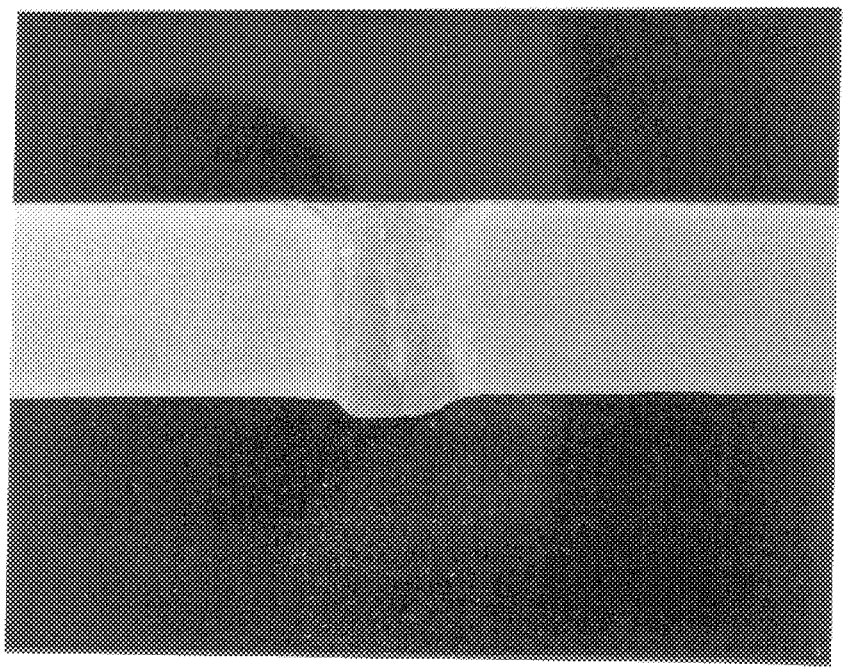
FIGS. 4A and 4B are photographs of cross sections of welds made on a ¼ inch thick plate of Type 304 stainless steel, both at a weld current of 150 amps, a voltage of 9 volts and a travel speed of 3 ipm.
Figure 4B:
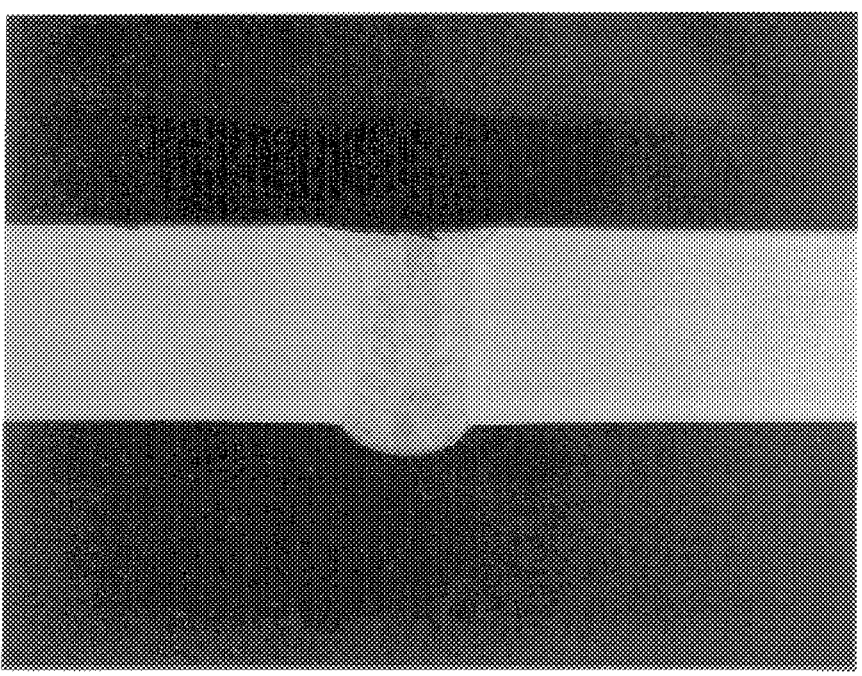

Comparison to Ostrovskii Flux FS-71. FIG. 3 shows partial penetration welds made with Ostrovskii Flux FS-71 using the procedures listed in Tables 1 and 2 and EWI Flux No. SS7 and FIG. 4 shows complete penetration welds. Table 9 lists the dimensions of the cross section of the welds. As shown in Table 9, SS7 produced approximately the same Ostrovskii Flux FS-71. In addition, the SS7 penetration/width ration was applied easily and adhered well. The Ostrovskii Flux FS-71 was difficult to apply evenly and tended to "flake off" ahead of the arc.

TABLE 9

Penetration, Bead Width, and Penetration-to-Width Ratio for Welds Made With Ostrovskii Flux FS-71 and EWI Flux No. SS7

| Flux | Current (A) | Penetration (in.) | Bead Width (in.) | Penetration/ Width | Area (in.$^2$) |
|---|---|---|---|---|---|
| FS-71 | 125 | 0.19 | 0.188 | 1.01 | 0.0245 |
| SS7 | 125 | 0.240 | 0.200 | 1.2 | 0.0254 |
| FS-71 | 150 | 0.240(a) | 0.230 | 1.0 | ? |
| SS7 | 150 | 0.240(a) | 0.240 | 1.0 | 0.0424 |

(a)Full penetration.

Flux SS7 was further evaluated to determine the compositional range for each of its components. Welds were made in two different heats of ¼ in. thick Type 304 Stainless steel using fluxes based on the mean composition of Flux No. SS7. The compositions of the fluxes are listed in Table 10. The ranges for each component was selected based on flux development trials and judgement to select realistic ranges.

TABLE 10

Fluxes That Were Evaluated to Determine the
Compositional Ranges for Each Component.
Fluxes were Based on the Nominal Composition of Flux No. SS7.

| Flux | TiO | SiO$_2$ | Cr$_2$O$_3$ |
|---|---|---|---|
| SS7 | 50 | 10 | 40 |
| S26 | 30 | 10 | 60 |
| S27 | 70 | 10 | 20 |
| S28 | 50 | 5 | 45 |
| S29 | 50 | 15 | 35 |
| S30 | 45 | 15 | 40 |
| S31 | 55 | 5 | 40 |

As shown by the welds in the Figs. 1B, 1C, and 1D, each individual component of the flux yields an increase in penetration, as compared to a weld made without flux as shown in Fig. 1A; however, restriction of the compositional ranges for certain components offers other benefits. For example, if the SiO$_2$ is increased to much greater than 10% of the total flux, the adhesion of the flux is reduced. Also, as the TiO is increased beyond about 60%, slightly more slag on the face of the weld.

Figure 5:
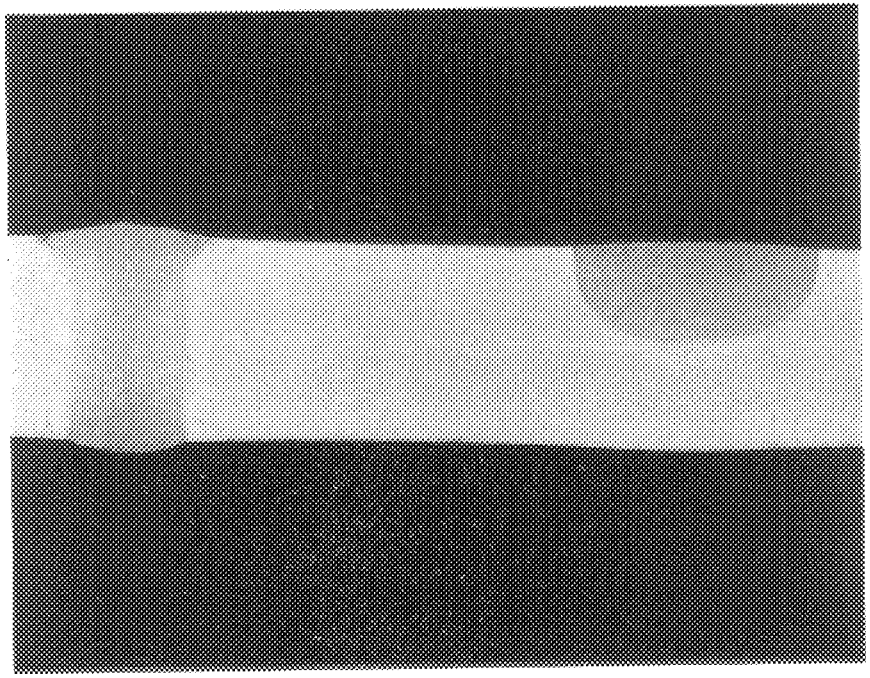
FIG. 5 is a photograph of a cross section of two welds made on a ¼ inch thick plate of Type 304 stainless steel, both at a weld current of 150 amps, a voltage of 9 volts and a travel speed of 3 ipm; the weld on the right was made without flux, the weld on the left was made with flux No. SS7.
Figure 6:
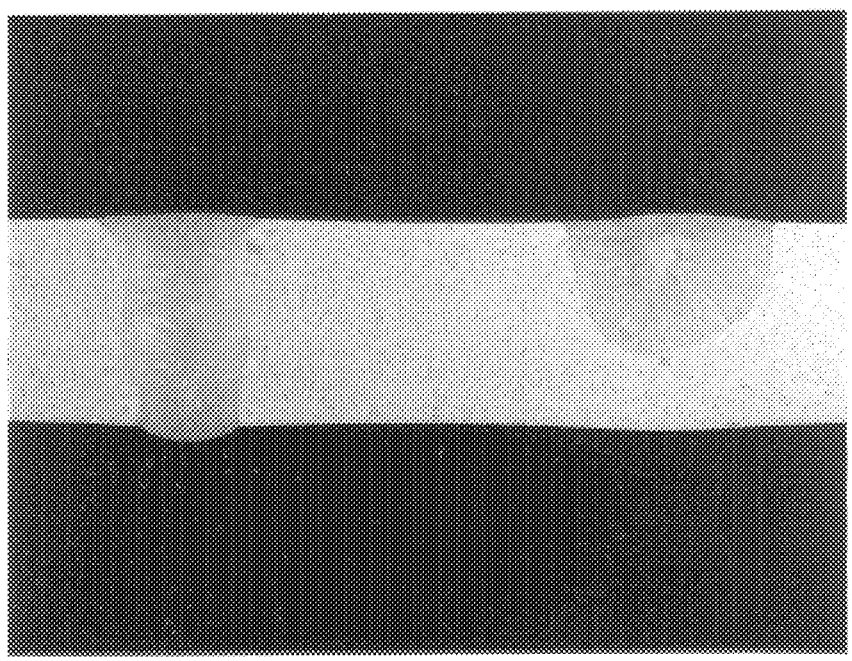
FIG. 6 is similar to FIG. 5 but on a different heat of Type 304 stainless steel; the two welds were both made at a weld current of 150 amps, a voltage of 9 volts and a travel speed of 3 ipm; the weld on the right was made without flux, the weld on the left was made with flux No. SS7.

The two heats of ¼ in. thick Type 304 stainless steel used in this procedure were chosen because of their sulfur contents and penetration characteristics. FIG. 5 (Heat No. 848184) and FIG. 6 (Heat No. 220832) show the penetration differences in these heats. The welds on the right in each Figure are made without flux and the welds on the left were made with Flux No. SS7.

TABLE 11

| | Heat No. | |
|---|---|---|
| | 220832 | 848184 |
| Sulfur (wt %) | 0.024 | <0.002 |
| Thickness | 0.249 | 0.247 |

Both the top and bottom surfaces of the stainless steel plates were lightly ground and cleaned with acetone.

Table 2 lists the welding procedure that was used. A welding current of 150A was selected because it has been found to produce "borderline" complete penetration in ¼ in. thick Type 304 stainless steel using Flux No. SS7. Thus, this welding current was used to discern flux compositions that were marginally acceptable. For each flux, a bead-on-plate weld was made in each heat of material. Before producing each weld, the plate was allowed to cool to room temperature.

TABLE 12

Welding Procedures Used to Determine the
Compositional Ranges for the Components in Flux No. SS7.

| | |
|---|---|
| Current | 150 A |
| Voltage | 9.0 V |
| Travel Speed | 3 ipm |
| Shielding Gas | Argon @ 25 to 30 cfh |
| Backing Gas | Argon @ 20 cfh |
| Electrode Size and Type | ³⁄₃₂-in. diameter, 2% thoriated |
| Electrode Tip Configuration | 45° included angle with ~0.02-in. truncation |

Figure 7:
FIG. 7 is a photograph of a cross section of a single heat of ¼ inch Type 304 stainless steel showing different penetrations that result when using flux Nos. S26A to S31A.
Figure 8:
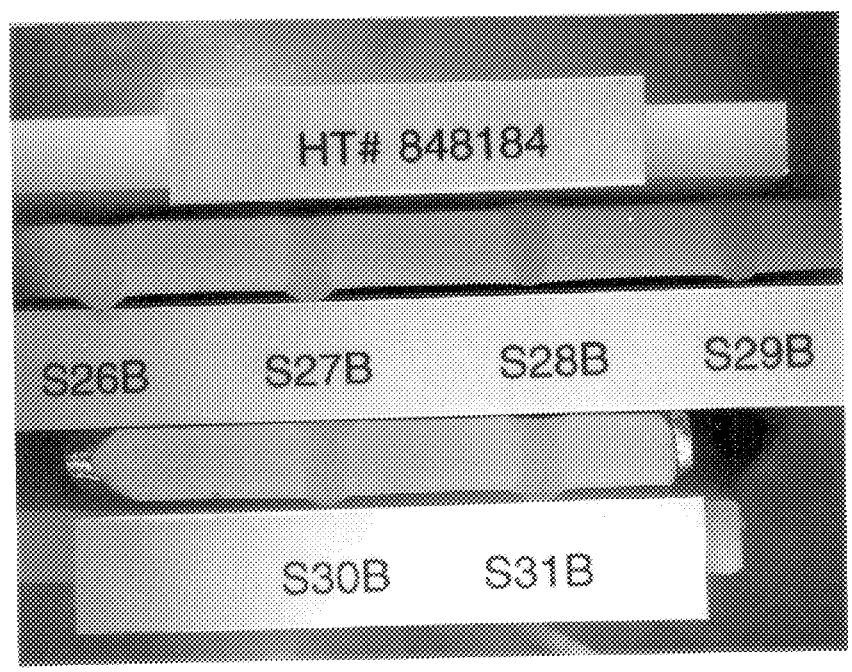
FIG. 8 is a photograph similar to FIG. 7 showing a different heat of ¼ inch Type 304 stainless steel and using flux Nos. S26A to S31A.

FIGS. 7 and 8 show cross-sections of the welds produced in Heat No. 220832 and 848184, respectively, using the fluxes listed in Table 10. Each flux produced complete penetration to various degrees. As shown by Weld No. S27A, S28A, and S28B in FIGS. 7 and 8, complete penetration was just barely achieved.

As a result of these trials, the compositional ranges for stainless steel flux has been established and are listed in Table 13. Flux No. SS7 represents the most desirable flux composition for use on stainless steels.

TABLE 13

Compositional Ranges for the Components of the Stainless Steel Flux.
Flux No. SS7 Represents the Target Composition.

| Flux No. SS7 | 50% TiO - 10% SiO$_2$ - 40% Cr$_2$O$_3$ |
|---|---|
| TiO: | 30%–70% |
| SiO$_2$ | –0.1 |
| Cr$_2$O$_3$ | 20%–60% |

Comparison of the ranges of the components in Table 13 for Flux No. SS7 to the Ostrovskii Flux FS-71 listed in Table 1 shows that the ranges for Flux No. SS7 are considerably different than for Ostrovskii Flux FS-71.

A comparison was next made to compare the performance of stainless steel fluxes containing titanium-monoxide or titanium-dioxide. Welds were made in two different heads of ¼ in. thick Type 304 stainless steel using fluxes containing SiO$_2$ and Cr$_2$O$_3$ and TiO or TiO$_2$. The compositions of the fluxes are listed in Table 14. The fluxes were applied in two different layer thicknesses; "thin" and "thick". The base metal was visible through the thin layer of flux, while the base was not visible through the thick layer.

TABLE 14

Fluxes That Were Used to Compare the
Performance of Stainless Steel Fluxes Containing TiO or TiO$_2$.

| Flux No. | TiO | TiO$_2$ | SiO$_2$ | Cr$_2$O$_3$ |
|---|---|---|---|---|
| SS7 | 50 | — | 10 | 40 |
| S36 | — | 50 | 10 | 40 |

The two heats of ¼ in thick Type 304 stainless steel was chosen because of the sulfur contents and penetration characteristics. Both the top and bottom surfaces of the plates were lightly ground and cleaned with acetone.

Table 12 lists the welding procedure that was used. A welding current of 150A was selected because it has been found to produce "borderline" complete penetration in ¼ in. thick Type 304 stainless using Flux No. SS7. Thus, this welding current was used to discern flux compositions that were marginally acceptable. For each flux, a bead-on-plate weld was made in each heat of material. Before producing each weld, the plate was allowed to cool to room temperature.

Figure 9:
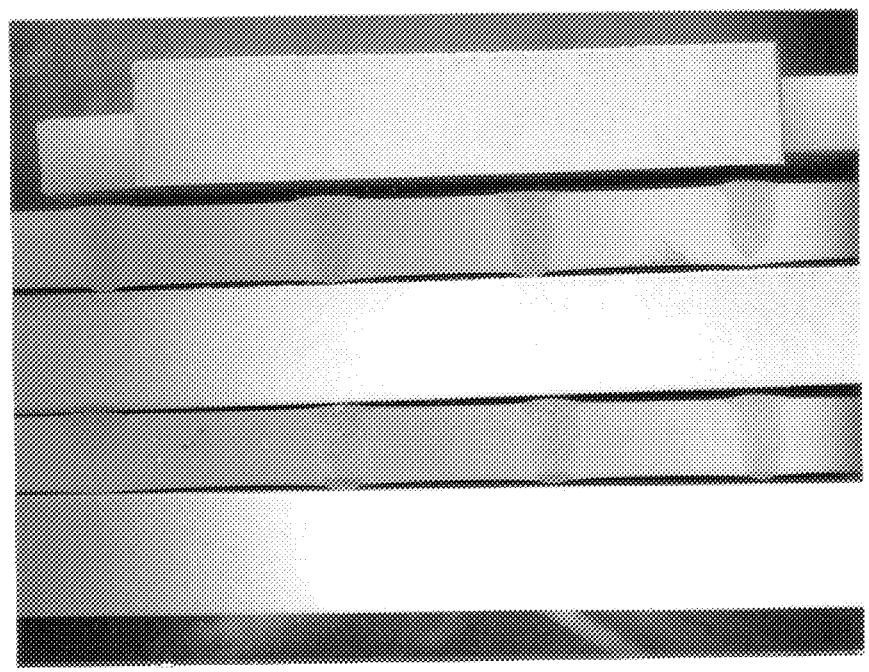
FIG. 9 is a photograph of a cross section of welds made on two different heats of ¼ inch thick Type 304 stainless steel using both thick and thin layers of fluxes No. S26 and SS7; the designation of TN indicates a thin layer while TK designates a thick layer.

FIG. 9 shows the cross-sections of welds produced with Flux No. SS7 and S36 in the two heats of base metal using two different flux layer thicknesses. As shown in Fig.1, both fluxes performed approximately the same. Although, Weld No. SS7TKB (thick layer) did not show complete penetration in the cross-section, other areas of the weld had complete penetration. The largest difference in penetration was found between welds made in Ht. No. 848184 with thin flux layers (Weld No. S36TNA and SS7TNA). Weld No. SS7TNA made with Flux No. SS7 had complete penetration while Weld No. S36TNA made with Flux No. S36 exhibited incomplete penetration. To verify these results, two more welds with each flux was produced in this heat of material. Again, the welds made with SS7 had more consistent penetration.

Flux made with TiO is slightly more tolerant to variations in flux thickness than fluxes made with TiO$_2$. However, both fluxes can be applied in a consistent thickness that will yield complete penetration.

In the examples given above, the flux material is a powder having a grain size of -325 mesh which are essentially pure, that is, having the following purity:

| | |
|---|---|
| TiO = 99.9% | SiO$_2$ = 99.8% |
| TiO$_2$ = 99+% | Cr$_2$O$_3$ = 99% |

The flux powders reagent or laboratory grade powders which are mixed in a carrier liquid, preferably methyl ethyl ketone, in the ratio of one part power mixture to two parts liquid. The powder compositions are given in weight percentages. It has been found that other carrier liquids can also be used, such as acetone and methanol, but these other two liquid tend to dry too quickly or too slowly after application, whereas methyl ethyl ketone provides good spreadability and a desirable drying time. The exact ratio of powder to liquid is not critical but it is mixed to the consistency of paint. The prepared solution is applied to the parts to be welded with a paint brush, typically ⅜ to ½ inch wide. The flux could also be applied with an air-brush or from an aerosol can. The stainless steel parts to be joined together were prepared in the normal manner, that is, by cleaning the surface with a wire brush or by grinding and then by wiping with a degreaser, such as acetone.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A flux for use in welding stainless steel to increase penetration, said flux consisting essentially of, in combination essentially pure oxide of titanium, Cr$_2$O$_3$, and SiO$_2$ in a liquid carrier.

2. The flux of claim 1 wherein the oxide of titanium in the range of from 41% to 63%, Cr$_2$O$_3$ in the range of 28% to 76%, and SiO$_2$ in the range of 5% to 27%.

3. The flux of claim 1 wherein the composition includes an oxide of titanium in the range of 30% to 70%, Cr$_2$O$_3$ in the range of 20% to 60%, and SiO$_2$ in the range of 5% to 15%.

4. The flux of claim 1 wherein the composition includes about 50% TiO, about 40% Cr$_2$O$_3$, and about 10% SiO$_2$.

5. The flux of claim 1 wherein the composition includes about 50% TiO$_2$, about 40% Cr$_2$O$_3$, and about 10% SiO$_2$.

6. A flux for use in welding stainless steel to increase penetration, said flux consisting of, in combination, an essentially pure oxide of titanium, Cr$_2$O$_3$, and SiO$_2$ in a liquid carrier.

7. A method of joining two stainless steel components comprising the steps of applying a thin layer of liquid flux over the joint, said liquid flux containing an oxide of titanium, Cr$_2$O$_3$, and SiO$_2$ in a liquid carrier, and welding the components together using a gas tungsten arc welding torch whereby said flux layer eliminates the variation in cross-sectional shape that results from heat-to-heat changes in the base metal chemistries of the stainless steel components being welded.

8. The method of claim 7 wherein the method includes using a liquid flux consisting of an oxide of titanium in the range of 30% to 70%, Cr$_2$O$_3$ in the range of 20% to 60%, and SiO$_2$ in the range of 5% to 15%.

9. The method of claim 7 wherein the method includes using a liquid flux consisting of an oxide of titanium in the range of from 41% to 63%, Cr$_2$O$_3$ in the range of 28% to 76%, and SiO$_2$ in the range of 5% to 27%.

10. The method of claim 7 wherein said liquid carrier consists of methyl ethyl ketone.

11. The method of claim 7 further including the steps of using the following approximate welding parameters for welding a ¼ inch thick 304 stainless steel component:

about 150 A welding current, about 9 V welding voltage, about 3 inches per minute welding torch travel speed, and a shielding gas of argon flowing at approximately 25 to 30 cubic feet per hour and a backing gas of argon flowing at approximately 20 cubic feet per hour.

\* \* \* \* \*